United States Patent [19]
Klein

[11] Patent Number: 5,541,845
[45] Date of Patent: Jul. 30, 1996

[54] MONITORING OF ROUTE AND SCHEDULE ADHERENCE

[75] Inventor: Eric Klein, Mountain View, Calif.

[73] Assignee: Trimble Navigation Limited, Sunnyvale, Calif.

[21] Appl. No.: 285,130

[22] Filed: Aug. 2, 1994

[51] Int. Cl.$^6$ .................................................. G06G 7/78
[52] U.S. Cl. ..................... 364/449; 364/424.02; 364/443; 340/990; 340/995; 340/988; 73/178 R; 342/357
[58] Field of Search .................... 364/443, 444, 364/449, 461, 424.02, 450, 436; 340/990, 995, 988; 73/178 R; 342/357

[56] References Cited

U.S. PATENT DOCUMENTS

| | | | |
|---|---|---|---|
| 4,814,711 | 3/1989 | Olsen et al. | 324/331 |
| 5,177,684 | 1/1993 | Harker et al. | 364/436 |
| 5,229,941 | 7/1993 | Hattori | 364/424.02 |
| 5,272,638 | 12/1993 | Martin et al. | 364/444 |
| 5,359,529 | 10/1994 | Snider | 364/449 |
| 5,371,678 | 12/1994 | Nomura | 364/444 |

*Primary Examiner*—Kevin J. Teska
*Assistant Examiner*—Jacques H. Louis-Jacques
*Attorney, Agent, or Firm*—John Schipper

[57] ABSTRACT

A method for monitoring the movement of a vehicle along a selected route R to determine whether the vehicle is (i) adhering to that route and/or (ii) adhering to a selected time schedule along that route. Adherence to the route R requires that the vehicle travel within a corridor of selected positive width that surrounds a path defining the route R. Adherence to the time schedule requires that the vehicle move past one or more specified locations along or adjacent to the route R within a specified time interval. The method provides an electronic map with a visually perceptible display that indicates the present location of the vehicle and allows implementation of a snap-to-route command that displays the location on the route R that is closest to the present location of the vehicle.

12 Claims, 8 Drawing Sheets

Vehicle Present
Location (x(L),y(L))

5,541,845

MONITORING OF ROUTE AND SCHEDULE ADHERENCE

FIELD OF THE INVENTION

This invention relates to monitoring adherence by a vehicle to a planned route and schedule, using a location determination system.

BACKGROUND OF THE INVENTION

When a vehicle attempts to follow a planned route and schedule, it is often appropriate to monitor adherence by the vehicle to the route and/or schedule, especially if the vehicle is a common carrier, such as a public transit bus or railway train. In such instance, the vehicle schedule is often published, and some of the public relies on the schedule in planning for its transportation needs. If the route or schedule is regularly disrupted or modified substantially, monitoring route and schedule adherence will identify the problem and perhaps provide a solution, through modification of the published schedule and/or route.

Monitoring adherence to a route or schedule is not straightforward if the vehicle can make, or not make, many stops or slight excursions in response to the needs of its users. Some systems have been proposed for monitoring the present and past locations of a vehicle. In U.S. Pat. No. 4,651,157, Gray et al disclose a security monitoring and tracking system for a terrestrial or marine vehicle that uses navigational information provided an array of by a Loran-C or satellite-based signal transmitters. These signals are received by a transceiver mounted on the vehicle and are retransmitted to a central station for analysis and post-processing of the signals, to determine the latitude and longitude of the vehicle at the time the signals were originally received thereat.

Olsen et al, in U.S. Pat. No. 4,814,711, discloses a survey system for collection of real time data from a plurality of survey vehicles, each of which determines its present location using global positioning system (GPS) signals received from a plurality of GPS satellites. A central station periodically polls each survey vehicle and receives that survey vehicle's present location coordinates by radio wave communication. The central station compares that vehicle's path with a survey pattern assigned to that vehicle. The geophysical or survey data measured by a vehicle are also received by the central station and are coordinated with that vehicle's location at the time were taken.

A vehicle tracking system, using an on-board Loran or GPS navigational system, is disclosed in U.S. Pat. No. 5,014,206, issued to Scribner et al. The vehicle receives Loran or GPS signals and determines its present location coordinates but transmits these coordinates to a central station only upon the occurrence of a specified event or events. This event might be stopping of the vehicle for a time interval of length more than a selected threshold or opening of the cargo doors or any other unusual event.

Harker et al disclose a method for analyzing transportation schedules of a transportation vehicle, such as a railway train or bus, to produce optimized schedules, in U.S. Pat. No. 5,177,684. The method uses information on the vehicle's assigned path and average speed and mobility of the vehicle and determines a realistic, optimum schedule, including arrival and departure times, that the vehicle can adhere to along that path.

U.S. Pat. No. 5,191,341, issued to Gouard et al, discloses a tracking system for a plurality of marine vessels, using two or more radio beacons and a fixed or mobile central station. Each marine receives signals from each beacon and relays these signals to the central station for determination of the present location of the vessel, using standard intersections of two or more hyperbolas for this purpose. A vessel's present location is tracked for routing, entrance into and exit from a harbor, arrival at and departure from a pier, and other similar purposes.

Navigation apparatus that stores location coordinates for a sequence of intermediate or final destination points on a non-volatile memory, such as a CD-ROM, is disclosed by Nimura et al in U.S. Pat. No. 5,231,584. A vehicle or traveller activates the apparatus at a departure point, then communicates its arrival at one or more designated intermediate or final destination points by pressing a button at the time of arrival. The apparatus does not track time of arrival and provides little direct information on the present location of the vehicle or traveller between a departure point and the next destination point.

Stanifer et al, in U.S. Pat. No. 5,243,530, disclose a system for tracking a plurality of terrestrial, marine or airborne vehicles, using a local area network and packet communication of location information. Loran-C signals are received by a receiver/processor/transmitter on a vehicle, the vehicle's present location is determined, and this location information is transmitted to a central station, using LAN packet protocols, acknowledgment signals and backoff/retransmission procedures that are standard in the LAN art. If a given vehicle's present location is not received by the central station within a time interval of selected length, the central station requests transmission of the present location from that vehicle.

A navigation system that provides off-route detection and route re-optimization is disclosed in U.S. Pat. No. 5,262,775, issued to Tamai et al. The system is mounted on a vehicle and uses GPS or Loran signals to determine the present location of the vehicle. When the vehicle is determined to be off-course, relative to its planned route, by more than a selected threshold distance, the system notifies the vehicle operator of this deviation and computes and displays a new optimized route, beginning at the vehicle's present location.

In U.S. Pat. No. 5,272,638, Martin et al disclose a system for optimizing a travel route for a vehicle, based on a shortest-path algorithm of Dijkstra (which is neither explained nor referenced in the patent). The system uses a roadway database, with distances between roadway decision points included, and determines the order of destination points and the shortest route to be followed by a vehicle, such as a truck making deliveries to a plurality of destinations. The present location of the vehicle is not tracked between intermediate destination points along the route.

A navigation system using audio communication between the system and an operator of a vehicle is disclosed in U.S. Pat. No. 5,274,560, issued to LaRue. The system is provided with a roadway database, a departure point and a destination point. The system uses artificial intelligence techniques to determine the optimum route to be followed, then communicates with the vehicle operator to direct the vehicle along the chosen route, unless overridden by voice command from the vehicle operator. The present location of the vehicle is not tracked by an independent ground-based or satellite-based location determination system along the route.

What is needed is an approach that allows more focused monitoring of the vehicle's present location, based on the present time and the route and schedule nominally followed by the vehicle. Preferably, the frequency of reporting of the location and time of observation should be relatively low when the vehicle stays within its allocated ranges in space and time, and this frequency should become appreciable only where the vehicle manifests frequent or continuing above-threshold excursions relative to its planned route and/or schedule. Preferably, the approach should allow use of other location aids, such as a vehicle odometer, or use of other methods, such as dead reckoning, to supplement and improve the accuracy of the location and/or observation time determined by the monitoring system.

SUMMARY OF THE INVENTION

These needs are met by the invention, which provides methods for monitoring the adherence of a vehicle to a planned route and/or planned time schedule, within a selected corridor in location and time, where the vehicle follows a selected route. The invention uses a ground-based or satellite-based location determination (LD) system, such as GPS, GLONASS, Loran-C, Omega, Decca, Tacan, JTIDS Relnav or PLRS, positioned on the vehicle, to determine and store the present location of the vehicle. The vehicle communicates its present location, route status (on-route or off-route), schedule status (on-schedule, minutes ahead of schedule, or minutes behind schedule), and other relevant information, to a central station from time to time. The vehicle processor attempts to place the vehicle at the correct point on or mean the route by correlating the route and schedule data with the current time of day and current vehicle geo-position. The time of day and schedule data are used to localize the initial search. A snap-to-route command is provided to identify the location on the assigned route that is closest to the vehicle's present location as determined by the on-board LD system. If the present location of the vehicle is not available from the on-board LD system, the invention uses dead reckoning or route propagation to estimate the present location of the vehicle. Dead reckoning integrates vehicle distance travelled (computed from either the vehicle velocity vector or the odometer reading) with the direction cosines of the vehicle's motion to estimate the current position. Route propagation matches vehicle distance travelled, and optionally the direction cosines of the vehicle's motion, against the route and schedule data to achieve greater precision in estimating the vehicle position than can be achieved by dead reckoning alone.

DETAILED DESCRIPTION OF THE INVENTION

Figure 1:
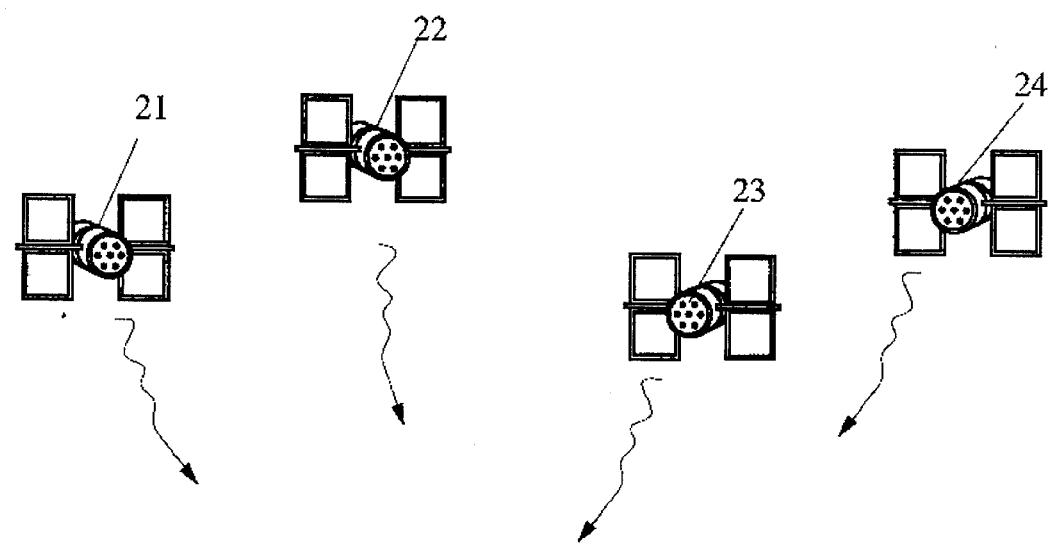
FIG. 1 illustrates an environment in which the invention can be used.
Figure 1:
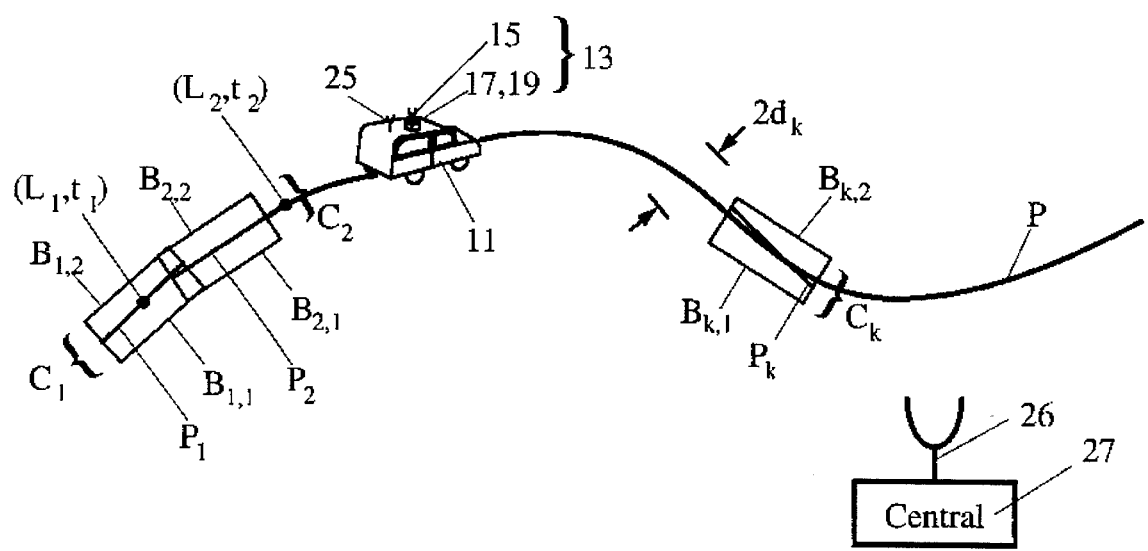

The invention can be used in an environment illustrated in FIG. 1, where a vehicle 11 proceeds along a selected route R according to a selected or predetermined schedule S. The selected route R is defined by a path P, which may be continuous or may include two or more separated path components, and a path is enclosed in a sequence of corridor segments $C_k$ (k=1,2, ... ). Each corridor segment $C_k$ surrounds a path segment $P_k$ and is defined by and includes two or more boundaries $B_{k,1}$ and $B_{k,2}$ that are spaced apart from that path segment by a positive distance $d_k$. The vehicle 11 is said to adhere to the route over that path segment if the vehicle remains within the corridor segment $C_k$ that surrounds and defines that path portion when the vehicle moves along or adjacent to that path segment.

The selected schedule of the vehicle 11 may be defined by a discrete sequence of pairs $(TI_n, L_n)$, with each such pair containing a location $L_n$ (n=1,2, ... ) along the path P and a corresponding time interval $TI_n$, given by $t_n - \Delta t_n \leq t \leq t_n + \Delta t_n$, with $\Delta t_n < 0$. It is further required that $t_n - \Delta t_n \leq t_{n+1} - \Delta t_{n+1}$, to provide a natural ordering of the time intervals $TI_n$. However, the constraint $t_n + \Delta t_n \leq t_{n+1} + \Delta t_{n+1}$ is not required.

The vehicle 11 is required to move through or adjacent to the location $L_n$ at a time t within the time interval $TI_n$. Adherence to a (time) schedule does not, by itself, require that the vehicle move along the path P, only that the vehicle pass through or near or adjacent to the locations $L_n$ within the respective time intervals $TI_n$. Adherence to a route or path P does not, by itself, require that the vehicle pass through any particular location, such as $L_n$, on the vehicle's actual path at any particular time. A vehicle may be monitored for adherence to a selected route, for adherence to a selected time schedule, or for adherence to a selected route and time schedule.

Figure 2:
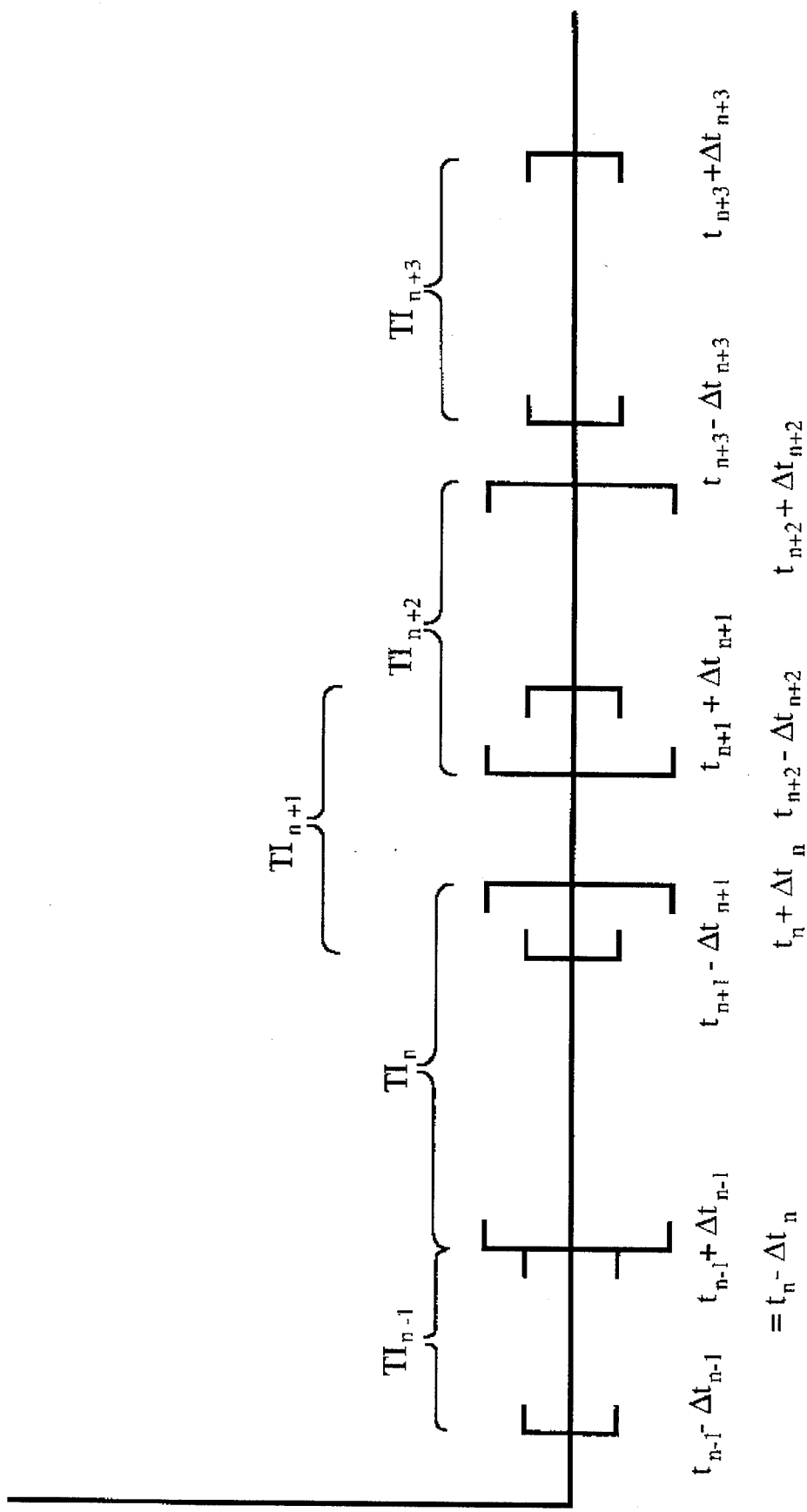
FIG. 2 illustrates time intervals associated with a time schedule S along a path P, used in one embodiment of the invention.

Assume that the vehicle 11 is being monitored for route and/or time schedule adherence. The vehicle will carry a location determination (LD) system 13 that includes an LD antenna 15, an LD receiver/processor 17, and a computer 19 containing an electronic map including the path P to be followed and/or the schedule S to be followed. Two or more consecutive time intervals $TI_n$ may have a non-empty intersection ($TI_n \Omega TI_{n+1} \neq \phi$, the empty set) including one time value or a range of time values in common, or this intersection may be empty, as illustrated in FIG. 2. The LD antenna 15 receives LD signals from three or more LD signal sources 21, 22, 23 and 24, which may be satellites or ground-based signal towers. If the vehicle 11 does not adhere to the route R, a transmitter 25 carried on the vehicle 11 transmits a route deviation signal, which may include the (first) location $L_d$ where route non-adherence occurred, to a receiver 26 at a central station 27 that collects such data (FIG. 1).

The path P may be approximated as a sequence $\{P_n\}_n$ of linear segments/brining a connected curve, where the intersection of two consecutive path segments $P_n$ and $P_{n+1}$ is a point or connected continuum of points on or near the actual path P. If the vehicle 11 follows a time schedule S for the path P, the vehicle need only be near the specified location $L_n$ for at least one time t within the time interval $TI_n$. Otherwise stated, it is only required that, for at least one time point t' in the time interval $TI_n$, a vehicle present location $L(t')$ be found at that time that is near the specified location $L_n$. If non-adherence to the time schedule S occurs, the vehicle transmitter 25 notifies the central station 27 and may include the specified location $L_d$ where schedule non-adherence (first) occurred.

Figure 3:
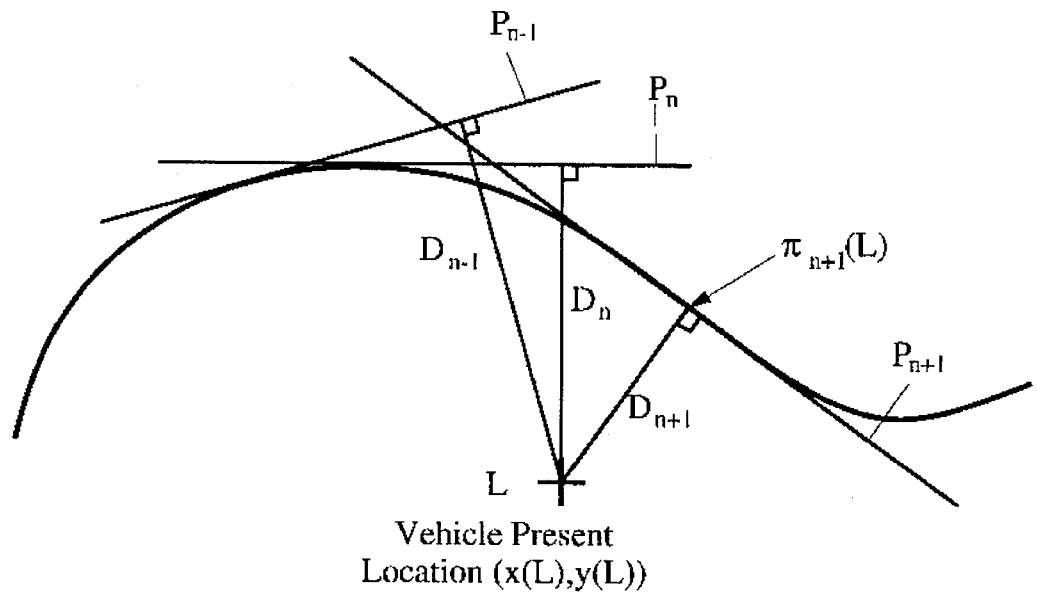
FIG. 3 illustrates a method of using a snap-to-route command in another embodiment of the invention.

FIG. 3 indicates a snap-to-route (SR) technique for locating a time-scheduled vehicle 11 by reference to the path P to be followed by that vehicle. Again, the path P is approximated by a sequence of linear segments $\{P_n\}_n$, where two consecutive segments have a non-zero intersection. At any time t, the time-scheduled vehicle 11 is determined by the LD system to have a location L that may or may not lie on any of the line segments $P_n$. Assume the vehicle location L has three-dimensional Cartesian coordinates (x(L), y(L), z(L)). Express the locus of points on a line segment $P_n$ in normal form as $$x \cos \theta_{x,n} + y \cos \theta_{y,n} + z \cos \theta_{z,n} = P_n, \quad (1)$$

where $\cos \theta_{x,n}$, $\cos \theta_{y,n}$ and $\cos \theta_{z,n}$ are the direction cosines of the normal to a plane containing the line segment $P_n$ and $P_n$ is the perpendicular distance from the coordinate origin to this plane. If the change in the vertical coordinate z along any path segment $P_n$ is ignored here (equivalent to setting $\cos \theta_{z,n} = 0$), Eq. (1) simplifies to $$x \sin \theta_n + y \cos \theta_n = P_n, \quad (2)$$

where $\theta_n$ is the angle that the line segment $P_n$ makes with the x-axis of the chosen coordinate system and $d_n$ is the length of the line drawn through the origin and perpendicular to the line segment $P_n$, as illustrated in FIG. 3. Equations (1) and (2) are derived by W. A. Wilson and J. I. Tracey, *Analytic Geometry*, D. C. Heath and Co., 1949, pages 63–64, 68, 266–269, incorporated by reference herein.

For each integer n=1, 2, . . . , the system computes a distance $D_n$ from the relation $$x(L) \cos \theta_{x,n} + y(L) \cos \theta_{y,n} + z(L) \cos \theta_{z,n} - P_n = -D_n(L). \quad (3)$$

The two-dimensional version of Eq. (3) becomes $$x(L) \sin \theta_n + y(L) \cos \theta_n - P_n = -D_n(L). \quad (4)$$

The system then determines the integer n=N for which $D_n(L)$ is minimized and displays the location of the perpendicular foot $\pi_N(L)$ of the vehicle location (x(L), y(L), z(L)) on the line segment $P_N$, as illustrated in FIG. 3. As used here, the "perpendicular foot" $\pi_n(L)$ is a point on a line segment $P_n$ that is closest to the vehicle location L. The LD system may have a snap-to-route command that, for any vehicle location (x(L), y(L), z(L)), displays the location $\pi_N(L)$ on the "closest" line segment $P_N$ that approximates part of the route R or path P to be followed by the vehicle 11. Optionally, the system can also display the distance $D_N(L)$ for the footer $\pi_N(L)$.

If two or more of the distances, say, $D_{N'}(L)$ and $D_{N''}(L)$, each achieve the minimum value among these distances, each corresponding perpendicular foot $\pi_{N'}(L)$ and $\pi_{N''}(L)$ can be displayed on the map. Alternatively, one of these perpendicular feet $\pi_{N'}(L)$ and $\pi_{N''}(L)$ can be chosen for display and/or further use, based upon an algorithm that compares the present velocity components ($v_{x,N}$, $v_{y,N}$, $v_{z,N}$) of the vehicle with the direction components ($\cos \alpha_{x,n}$, $\cos \alpha_{y,n}$, $\cos \alpha_{z,n}$) of a tangent line drawn to each of the path segments $P_{N'}$ and $P_{N''}$ at the respective locations $\pi_{N'}$ and $\pi_{N''}$ on these path segments. The perpendicular foot $\pi_N(L)$ (N=N' or N") would be chosen for which the local tangent line components of the path segment provide the best match for the present velocity components. That is, the quantity $$\Delta v_N = [(v_{x,n} - v_N \cos \alpha_{x,N})^2 + (v_{y,n} - v_N \cos \alpha_{y,N})^2 + (v_{z,n} - v_N \cos \alpha_{z,N})^2]^{1/2}, \quad (5)$$

is minimized by the choice of N=N' or N=N", where $$v_N = [v_{x,N}^2 + v_{y,N}^2 + v_{z,N}^2]^{1/2} \quad (6)$$

is the magnitude of the present velocity of the vehicle.

At times the LD system may be unable to provide an estimated location for the vehicle 11 of interest, because of signal interference by an electromagnetic disturbance in the troposphere or ionosphere, because of shadowing by an opaque or partly opaque structure that is located between the moving vehicle and a source of LD signals, or for other reasons. In such situations, a dead reckoning (DR) approach can be used to estimate the present location of the vehicle 11, assuming that the velocity components (or the acceleration components) of the vehicle remain unchanged over the time interval for which DR approximation is used.

Assume that the last vehicle location provided by the LD system had the location coordinates ($x(t_1)$, $y(t_1)$, $z(t_1)$), with $t_1 = t_L - \Delta t < t_L$, before the location signals were lost. Using an average velocity vector ($v_{x,avg}$, $v_{y,avg}$, $v_{z,avg}$) of the vehicle (found from comparison of location coordinates for times up to and including $t = t_1$) and assuming that the vehicle acceleration components are zero, the vehicle's predicted progress along or parallel to the sequence of line segments $P_n$ is estimated or extrapolated to provide an extrapolated location for $t > t_1$ for the vehicle, with location coordinates approximately given by $$x(t) = x(t_1) + v_{x,avg}(t - t_1) \ (\Delta t_1), \quad (7)$$

$$y(t) = y(t_1) + v_{y,avg}(t - t_1), \quad (8)$$

$$z(t) = z(t_1) + v_{z,avg}(t - t_1). \quad (9)$$

If the average acceleration components ($a_{x,avg}$, $a_{y,avg}$, $a_{z,avg}$) of the vehicle for times preceding the time $t = t_1 = t_L - \Delta t$ are also taken into account, Eqs. (7), (8) and (9) are replaced by the relations $$x(t) = x(t_1) + v_{x,avg}(t - t_1) + a_{x,avg}(t - t_1)^2/2 \ (t \geq t_1), \quad (10)$$

$$y(t) = y(t_1) + v_{y,avg}(t - t_1) + a_{y,avg}(t - t_1)^2/2, \quad (11)$$

$$z(t) = z(t_1) + v_{z,avg}(t - t_1) + a_{z,avg}(t - t_1)^2/2. \quad (12)$$

As in the preceding development, the vertical coordinate (z) Equations (9) and/or (12) can be deleted if substantially all vehicle motion takes place approximately in a plane. This DR extrapolation can be used to estimate the vehicle's present location for short time intervals when the LD system cannot provide accurate location coordinates.

Alternatively, an odometer or other distance measuring device can be mounted on the vehicle to determine the accumulated distance $\delta(t)$ moved by the vehicle at any time t. If signals from the LD system are lost after a time $t = t_1 = t_L - \Delta t$, the present location coordinates of the vehicle are then determined approximately by the relations $$x(t) = x(t_1) + [\delta(t) - \delta(t_1)] \cos \theta_{vx,avg} (t \geq t_1), \quad (13)$$

$$y(t) = y(t_1) + [\delta(t) - \delta(t_1)] \cos \theta_{vy,avg}, \quad (14)$$

$$z(t) = z(t_1) + [\delta(t) - \delta(t_1)] \cos \theta_{vz,avg}. \quad (15)$$

Here ($\cos \theta_{vx,avg}$, $\cos \theta_{vy,avg}$, $\cos \theta_{vz,avg}$) are the average velocity direction cosines of the vehicle for time $t \leq t_L - \Delta t$ and are defined by the vehicle average velocity components $$\cos \theta_{vx,avg} = v_{x,avg}/[v_{x,avg}^2 + v_{y,avg}^2 + v_{z,avg}^2]^{1/2}, \quad (16)$$

$$\cos \theta_{vy,avg} = v_{y,avg}/[v_{x,avg}^2 + v_{y,avg}^2 + v_{z,avg}^2]^{1/2}, \quad (17)$$

$$\cos \theta_{vz,avg} = v_{z,avg}/[v_{x,avg}^2 + v_{y,avg}^2 + v_{z,avg}^2]^{1/2}, \quad (18)$$

for some interval of times $t \leq t_1$. This alternative has the advantage that the vehicle's actual speed for times $t > t_1$ are accounted for by use of the odometer distance δ(t).

As a second alternative for dead reckoning, the vehicle can use an on-board magnetometer or other device that senses the present direction that the vehicle is travelling, plus a speedometer or other velocity monitor that determines the vehicle speed v(t), to estimate the present location coordinates of the vehicle by the relations $$x(t) = x(t_1) + \int_{t_1}^{t} v(t')\cos\theta_{vx}(t')dt' \quad (t > t_1), \tag{19}$$

$$y(t) = y(t_1) + \int_{t_1}^{t} v(t')\cos\theta_{vy}(t')dt', \tag{20}$$

$$z(t) = z(t_1) + \int_{t_1}^{t} v(t')\cos\theta_{vz}(t')dt', \tag{21}$$

One problem often encountered with use of dead reckoning is that the vehicle heading, given by the velocity direction cosine coordinates (cos θ$_{vx}$, cos θ$_{vy}$, cos θ$_{vz}$), drifts with passage of time. The dead reckoning and snap-to-route techniques can be combined to provide periodic recalibration of the heading or direction cosine coordinates, by adjusting the estimated heading coordinates by the local direction cosines of the path segment P$_N$ at the snap-to-route location of the perpendicular footer π$_N$. The snap-to-route direction cosines at the perpendicular footer location π$_N$ and/or the spatial location coordinates of the perpendicular footer π$_N$ can be substituted for the corresponding values that are presently estimated using DR. The time interval for recalibration of these DR estimates is determined by the estimated drift in the heading coordinates; the time interval length for recalibration decreases as the maximum drift rate increases.

Alternatively, each DR-determined estimate of vehicle location coordinates and/or vehicle heading coordinates can be replaced by the corresponding location coordinates and/or heading coordinates determined using the SR technique. Here, DR is used to estimate the location and heading coordinates, and these estimates are automatically replaced by the location and heading coordinates determined using SR to identify a path segment P$_N$ and perpendicular footer π$_N$ on this path segment.

Figure 4:
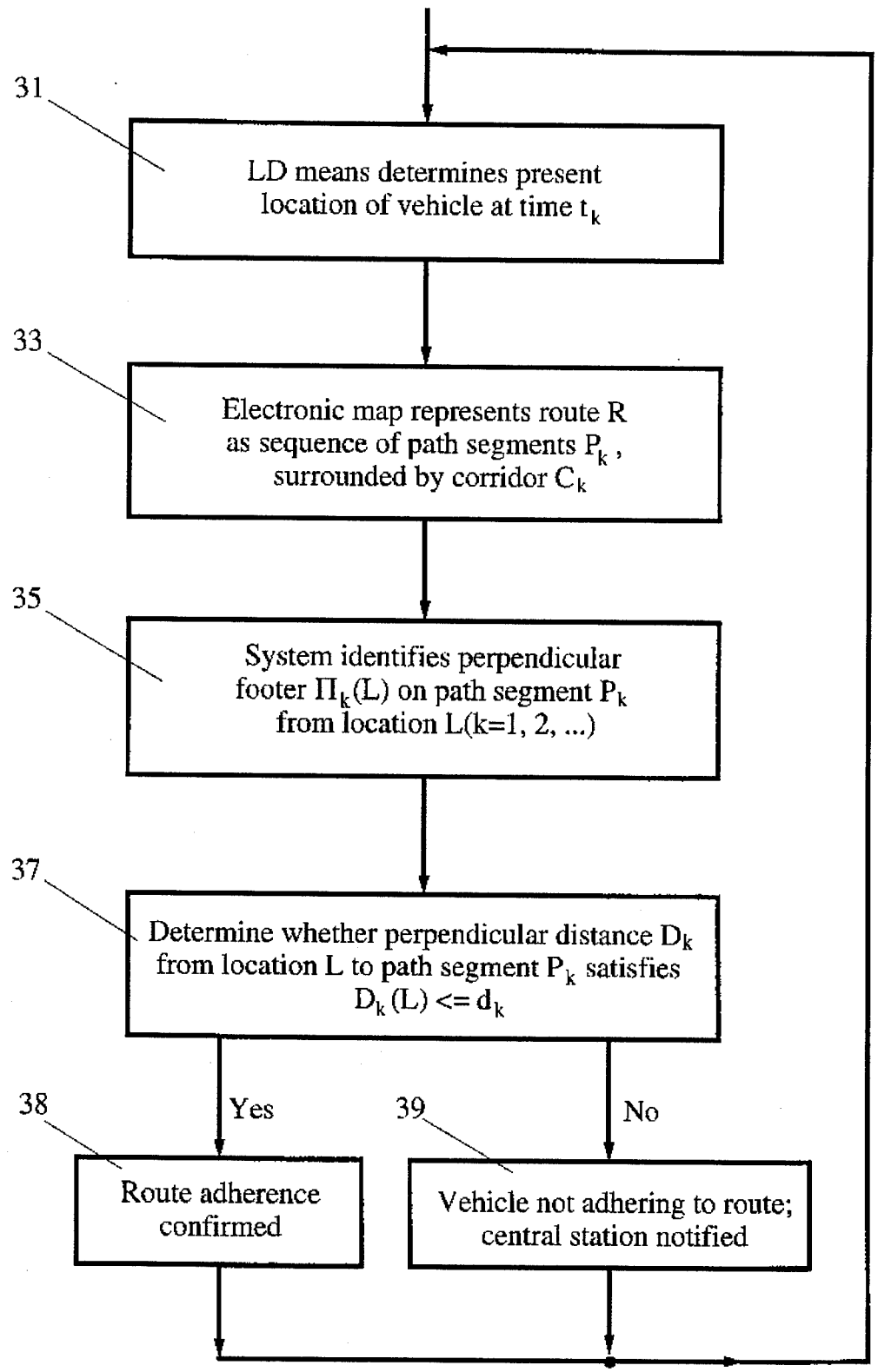
FIGS. 4 and 5 are flow charts illustrating procedures suitable for monitoring adherence to a selected route or to a selected time schedule along that route.
Figure 5:
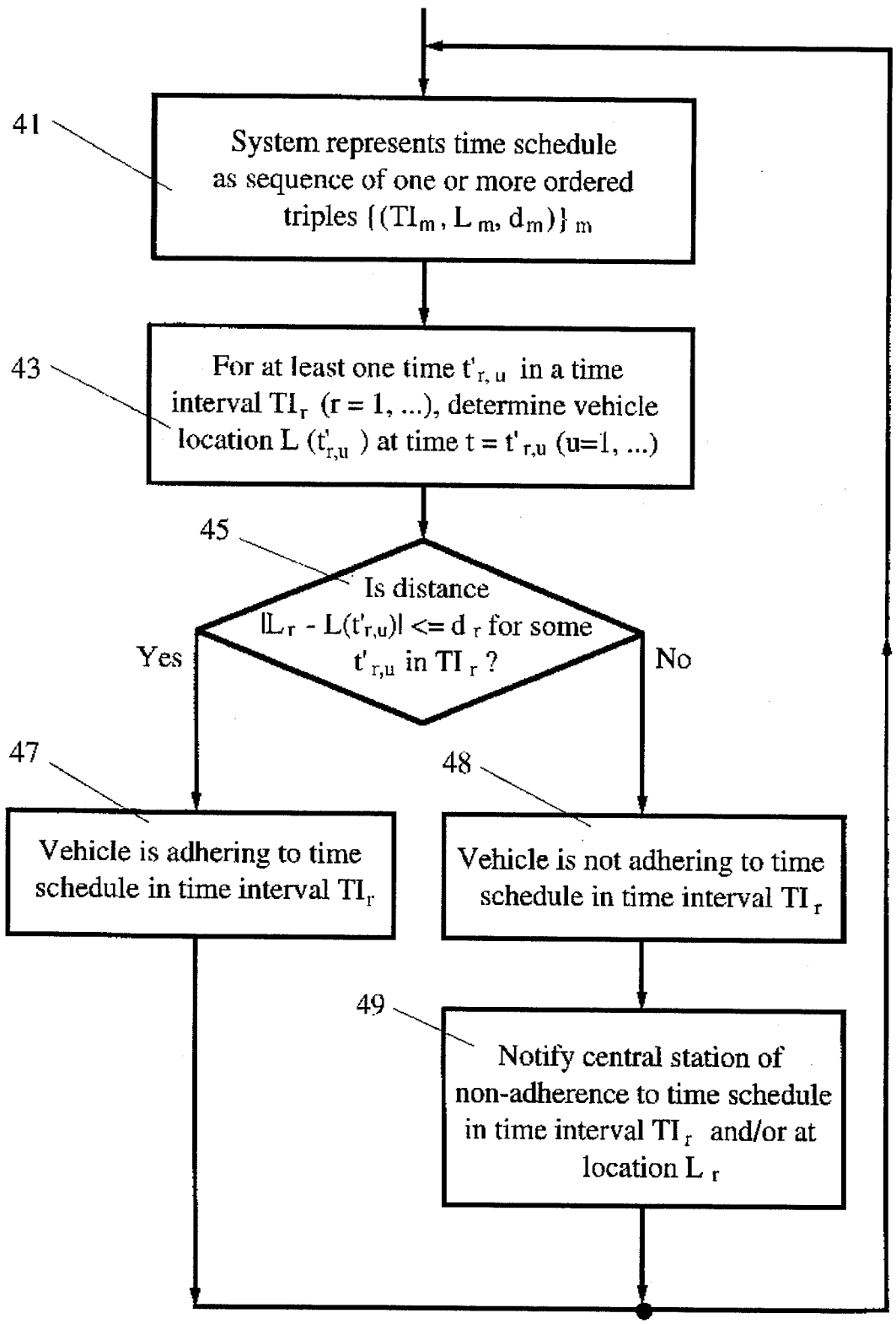
Figure 6:
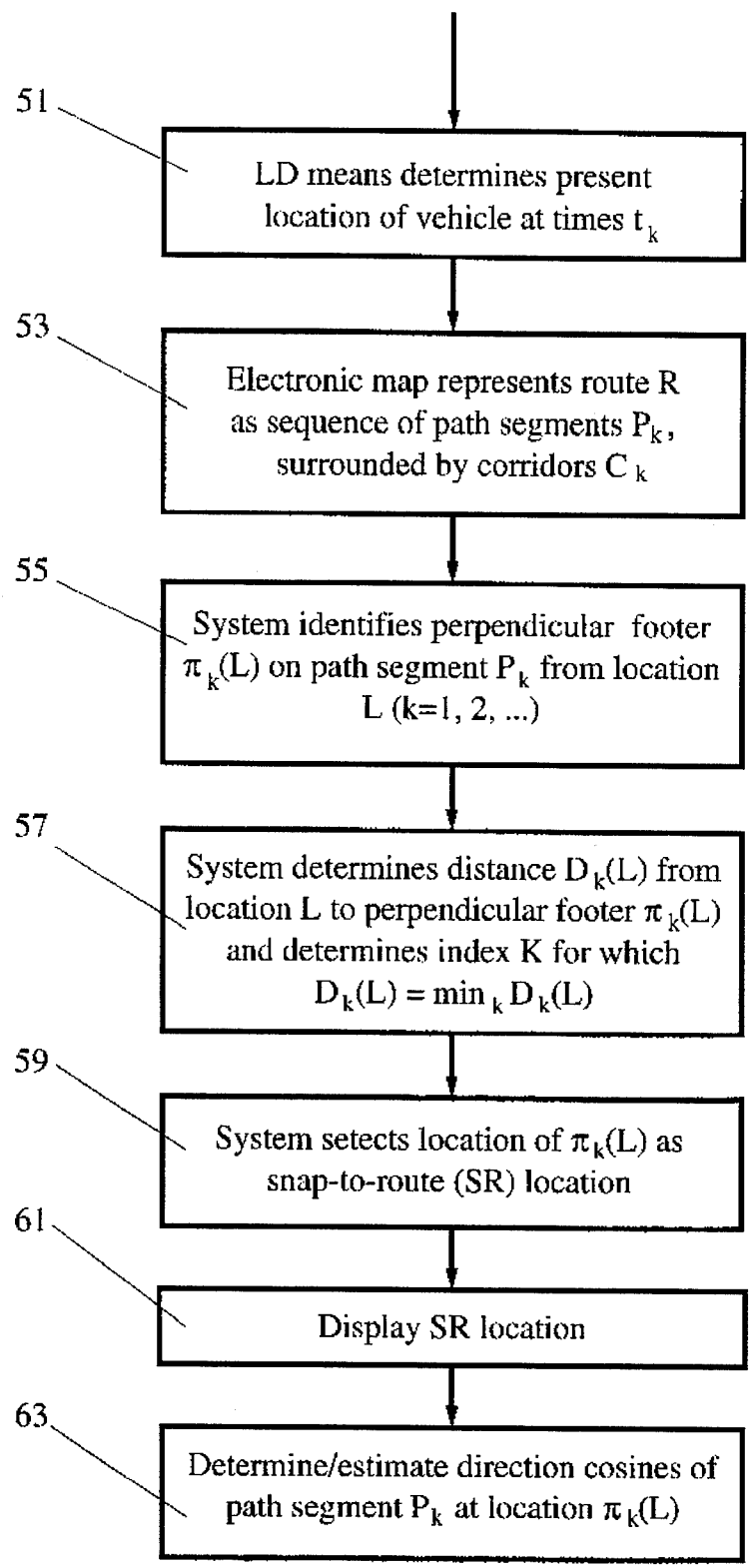

FIGS. 4 and 5 illustrate suitable procedures for monitoring adherence by a vehicle to a selected route R and to a selected time schedule along the route R, respectively. In step 31 of FIG. 4, a location determination (LD) means carried by the vehicle determines the present location L of the vehicle at a sequence of one or more discrete times. In step 33, an electronic map connected to the LD means represents a selected route R as a sequence of path segments P$_k$, with each such path segment being surrounded by a segment corridor C$_k$ of selected, positive, transverse width 2d$_k$. In steps 35 and 37, the system determines a perpendicular footer π$_k$(L) of the location L, if it exists, on each of the path segments P$_k$ and determines whether, for at least one value of the index k, the distance D$_k$(L) satisfies $$D_k(L) \leq d_k. \tag{22}$$

If Eq. (12) is satisfied for at least one value of the index k, the vehicle is determined to be adhering to the selected route R at the vehicle location L (step 38). Otherwise, the vehicle is determined to be not adhering to the selected route R at the vehicle location L (step 39). After step 38 or step 39, the system recycles and considers another path segment P$_k$ or another segment corridor C$_k$, if any.

In step 41 of FIG. 5, the system represents a selected tome schedule as an ordered sequence of one or more triples {(TI$_m$,L$_m$,d$_m$)}$_m$, where TI$_m$={t|t$_m$−Δt$_m$≤t≤t$_m$+Δt$_m$} is a time interval positive length 2Δt$_m$, L$_m$ is a selected location (specified by location coordinates) in a region through which the vehicle passes, and d$_m$ is a selected positive distance. In step 43, a location determination (LD) means carried by the vehicle determines the present location L(t'$_{r,u}$) (u=1,2,...) of the vehicle at a sequence of one or more discrete times t'$_{r,u}$ in at least one of the time intervals TI$_r$. In step 45, the system determines whether at least one of the locations L(t'$_{r,u}$) determined in the time interval TI$_r$ is sufficiently close to the prescribed location L$_r$ in that time interval; that is, whether $$\text{distance } |L(t'_{r,u}) - L_r| \leq d_r. \tag{23}$$

If the answer is "yes", the system determines in step 47 that the vehicle is adhering to the time schedule in the time interval TI$_r$. If the answer is "no", the system determines in step 48 that the vehicle is not adhering to the time schedule in the time interval 48. After step 48, the system optionally notifies the central station that the vehicle has not adhered to the time schedule in the time interval TI$_r$ and/or of the location L$_r$ where time schedule non-adherence has occurred. After step 47 or step 48, the system recycles and considers a new time schedule triple (TI$_m$,L$_m$,d$_m$) (m≠r), if any.

FIGS. 6, 7, 8, 9 and 10 illustrate suitable procedures for determining the spatial location coordinates and/or the heading coordinates for a vehicle, using SR, using DR, and using SR and DR combined, respectively. In step 51 of FIG. 6, a location determination (LD) means carried by the vehicle determines the present location L of the vehicle at a sequence of one or more discrete times f$_k$. In step 53, an electronic map connected to the LD means represents a selected route R as an ordered sequence of path segments P$_k$. In step 55, the system computes the location of the perpendicular foot π$_k$ for the location L on one or more path segments P$_k$. In step 57, the system determines the distances D$_k$(L) of each perpendicular foot π$_k$(L) from the location L and determines the index k=K with the minimum distance D$_k$(L). In step 59, the system selects the location π$_K$(L) as the SR vehicle location on the route R. In step 61 (optional), the system displays this selected SR location π$_K$(L) numerically in terms of its location coordinates and/or graphically on a map. In step 63 (optional), the system determines or estimates the direction cosines for the path segment P$_K$ at the location of the perpendicular foot π$_K$(L).

Figure 7:
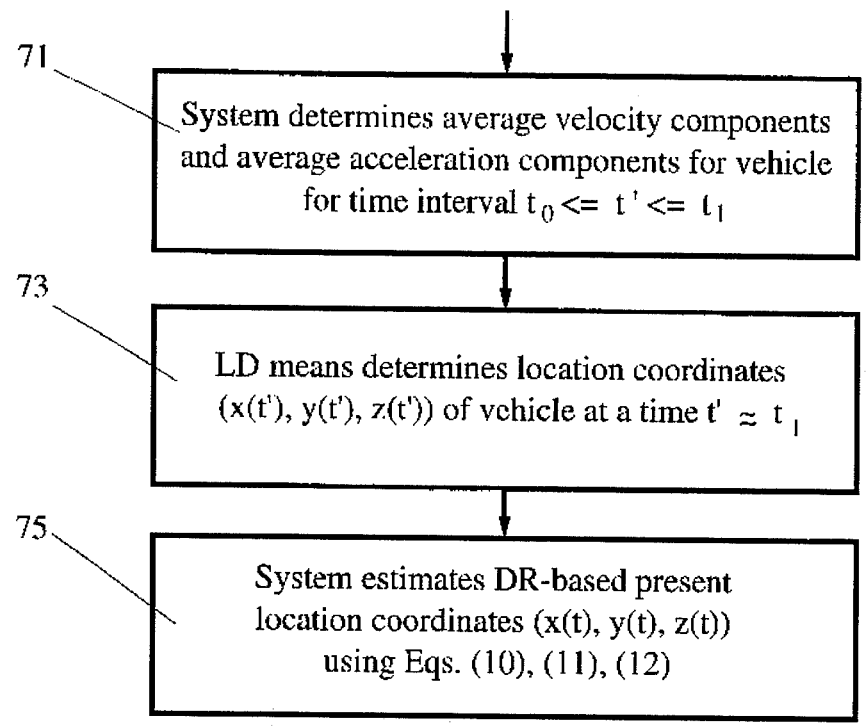

In step 71 of FIG. 7, the system determines average velocity components (v$_{x,avg}$, v$_{y,avg}$, v$_{z,avg}$) and/or average acceleration components (a$_{x,avg}$, a$_{y,avg}$, a$_{z,avg}$) for the vehicle up to and including a time t'=t$_1$=t$_L$−Δt. In step 73, a location determination (LD) means carried by the vehicle. In step 75, the system estimates the DR-based present location coordinates of the vehicle for a time t>t$_1$ using the relations $$x(t)=x(t_1)+v_{x,avg}(t-t_1)+a_{x,avg}(t-t_1)^2/2, \tag{10}$$

$$y(t)=y(t_1)+v_{y,avg}(t-t_1)+a_{y,avg}(t-t_1)^2/2, \tag{11}$$

$$z(t)=z(t_1)+v_{z,avg}(t-t_1)+a_{z,avg}(t-t_1)^2/2. \tag{12}$$

discussed above for t>t$_1$. As in the above discussions, one or more of the acceleration components can be set equal to zero here. As in the above discussions, the vertical or "z" coordinate term can be ignored here.

Figure 8:
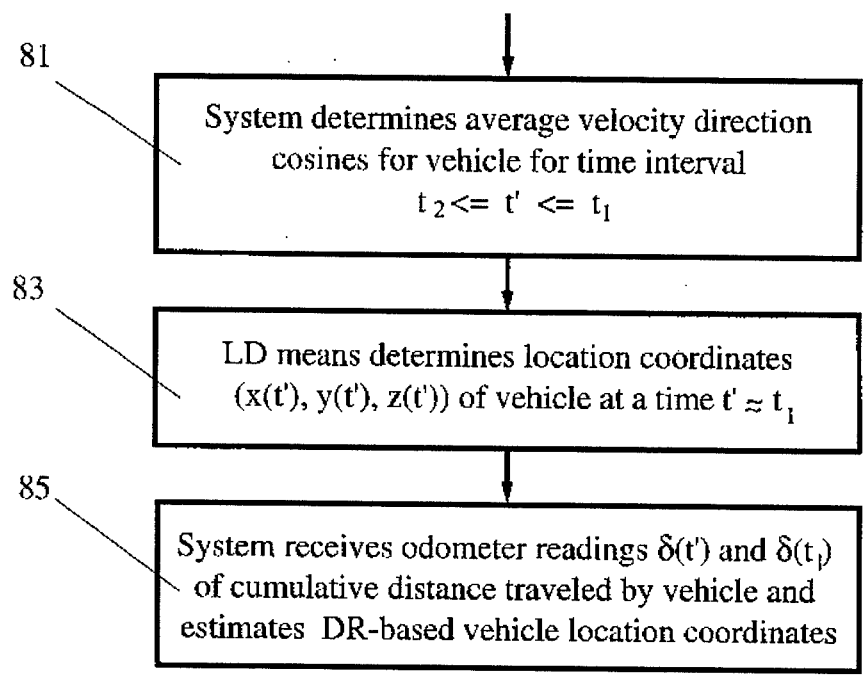

In step 81 of FIG. 8, the system determines average velocity direction cosine components (θ$_{vx,avg}$, θ$_{vy,avg}$, θ$_{vz,avg}$) for the vehicle up to and including a time t'=t$_1$. In step 83, a location determination (LD) means carried by the vehicle determines the present location coordinates (x(t'), y(t'), z(t')) of the vehicle location L at a sequence of one or more discrete times t'≈t₁ up to the time =t₁. In step 85, the system receives vehicle odometer readings of vehicle cumulative distance traveled δ(t₁) and δ(t') for times t≈t₁'. In step 87, the system estimates the DR-based present location coordinates of the vehicle for a time t>t₁ with an odometer, using the relations $$x(t)=x(t_1)+[\delta(t)-\delta(t_1)] \cos \theta_{vg,avg} \ (t>t_1), \quad (13)$$

$$y(t)=y(t_1)+[\delta(t)-\delta(t_1)] \cos \theta_{vg,avg}, \quad (14)$$

$$z(t)=z(t_1)+[\delta(t)-\delta(t_1)] \cos \theta_{vz,avg}. \quad (15)$$

Figure 9:
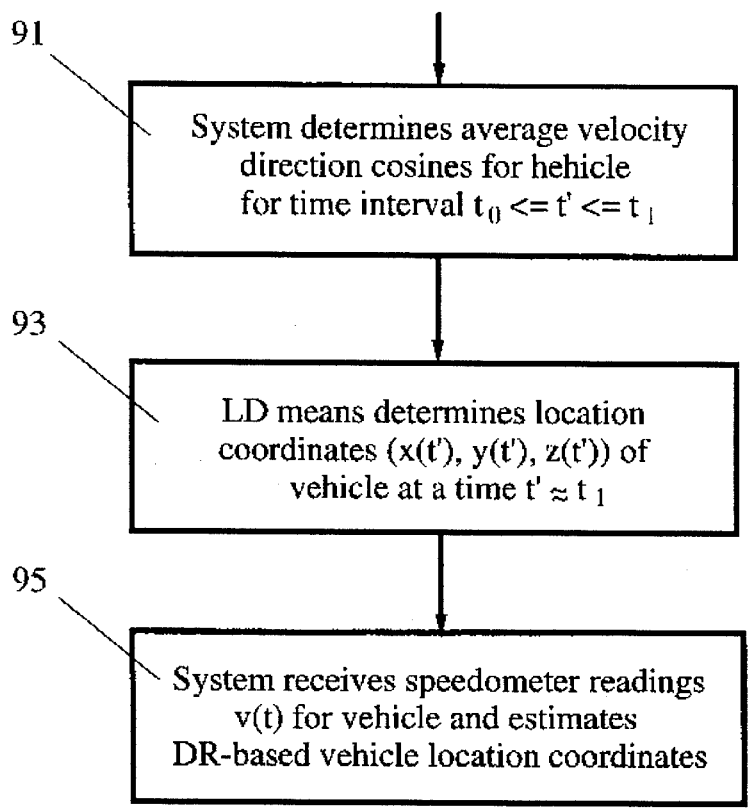
FIGS. 6, 7, 8, 9, 10 are flow charts of procedures, according to the invention, that can be used to determine spatial location coordinates and velocity coordinates of a monitored vehicle with reference to a selected route or time schedule, using snap-to-route and dead reckoning techniques.

In step 91 of FIG. 9, the system determines average velocity direction cosine components ($\theta_{vx,avg}$, $\theta_{vy,avg}$, $\theta_{vz,avg}$) for the vehicle up to and including a time t'=t₁. In step 93, a location determination (LD) means carried by the vehicle determines the present location coordinates (x(t'), y(t'), z(t')) of the vehicle location L at a sequence of one or more discrete times t'≈t₁ up to the time t'=t₁. In step 95, the system receives vehicle speedometer readings v(t) for times t>t₁ and estimates the DR-based present location coordinates of the vehicle for a time t>t₁ with a speedometer, using the relations $$x(t) = x(t_1) + \int_{t_1}^{t} v(t')\cos\theta_{vx,avg} dt' (t > t_1), \quad (19')$$

$$y(t) = y(t_1) + \int_{t_1}^{t} v(t')\cos\theta_{vy,avg} dt', \quad (20')$$

$$z(t) = z(t_1) + \int_{t_1}^{t} v(t')\cos\theta_{vz,avg} dt', \quad (21')$$

Figure 10:
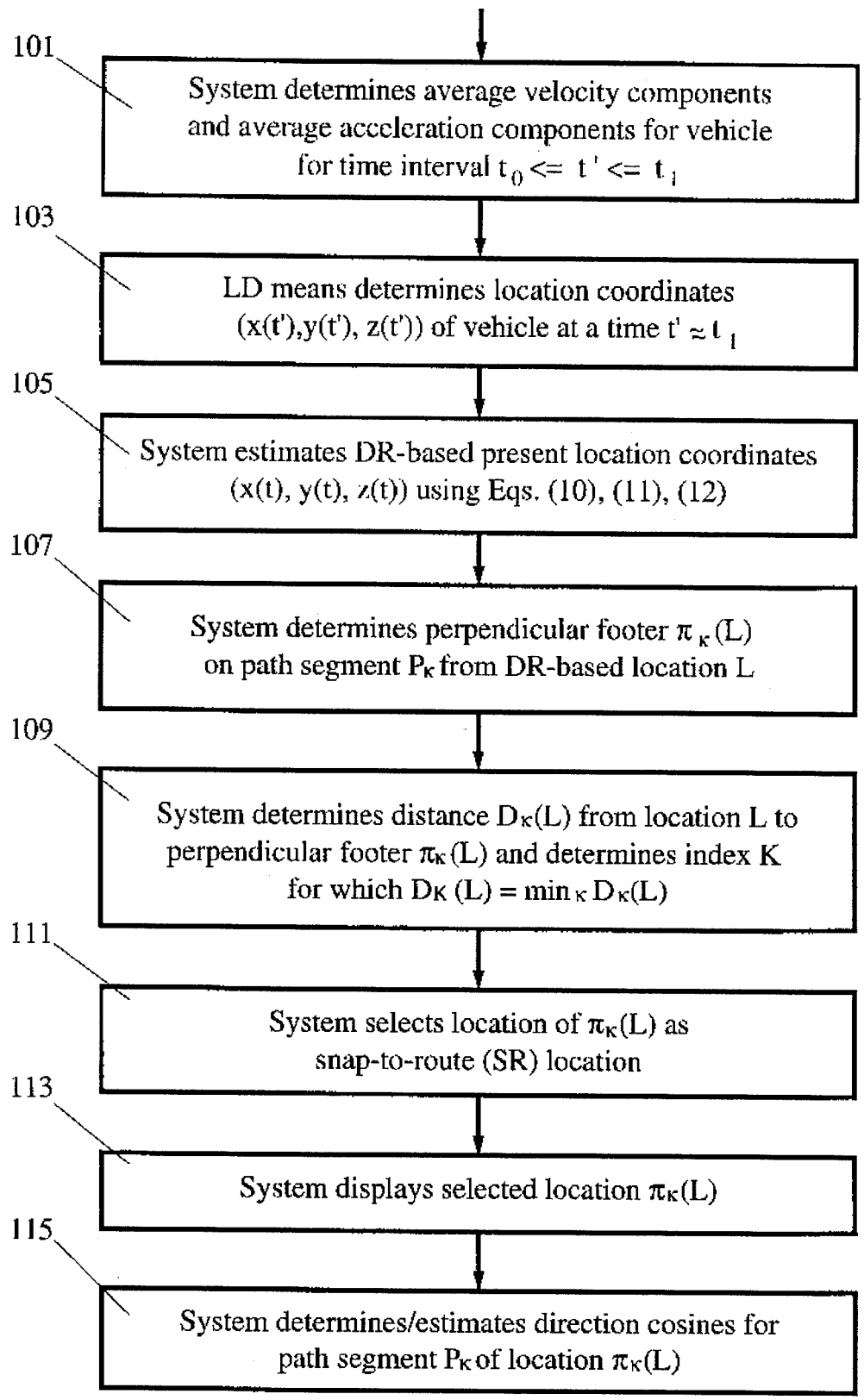

Steps 101, 103 and 105 of FIG. 10 are identical to the steps 71, 73 and 75, respectively, in FIG. 7. In step 107, the system computes the location of the perpendicular foot $\pi_k(L)$ for the location L on one or more path segments $P_k$. In step 109, the system determines the distances $D_k(L)$ of each of these perpendicular feet $\pi_k(L)$ from the location L and determines the index k=K with the minimum distance $D_k(L)$. In step 111, the system selects the location $\pi_K(L)$ as the combined DR/SR vehicle location on the route R. In step 113 (optional), the system displays this selected location $\pi_K(L)$, numerically in terms of its location coordinates and/or graphically on a map. In step 115 (optional), the system determines or estimates the direction cosines for the path segment $P_K$ at the location of the perpendicular footer $\pi_K(L)$.

One suitable LD signal system is a Satellite Positioning System (SATPS), such as the Global Positioning System (GPS) or Global Navigation Orbiting System (GLONASS) or similar satellite-based location determination system (collectively referred to as GPS herein). A Global Positioning System is discussed in detail in Tom Logsdon, *The NAVSTAR Global Positioning System,* Van Nostrand Reinhold, 1992, pp. 17–90, which is incorporated by reference herein. Use of the GPS and GLONASS signals is also discussed in detail below.

Alternatively, the GPS signals may be replaced by Loran-C signals produced by three or more Loran signal sources positioned at fixed, known locations, for outside-the-building location determination. A Loran-C system relies upon a plurality of ground-based signal towers, preferably spaced apart 100–300 km, that transmit distinguishable electromagnetic signals that are received and processed by a Loran signal antenna and Loran signal receiver/processor. A representative Loran-C system is discussed in *Loran-C User Handbook,* Department of Transportation, U.S. Coast Guard, Commandant Instruction M16562.3, May 1990, which is incorporated by reference herein. Loran-C signals use carrier frequencies of the order of 100 kHz and have maximum reception distances of the order of hundreds of kilometers.

Other ground-based radiowave signal systems that are suitable for use as an LD system include Omega, Decca, Tacan, JTIDS Relnav (U.S. Air Force Joint Tactical Information Distribution System) and PLRS (U.S. Army Position Location and Reporting System) and are summarized by Logsdon, op. cit., pp. 6–7 and 35–40, incorporated by reference herein.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the C/P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay ocf⁻²). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, op cit.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemeris for each identified SATPS satellite. The SATPS signal antenna and signal receiver/processor are part of the user segment of a particular SATPS, the Global Positioning System, as discussed by Tom Logsdon, op cit.

I claim:

1. Apparatus for monitoring adherence of a vehicle to a selected vehicle route from a vehicle monitoring station, the apparatus comprising:

location determination (LD) means, carried on a selected vehicle, for receiving LD signals from an LD signal source spaced apart from the vehicle and for determining and recording the location coordinates corresponding to a location $L(t_s)$ of the vehicle at a selected time $t=t_s$;

a computer, carried on the vehicle and communicating with the LD means, having an electronic map of a selected route R, where the selected route is approximated by an ordered sequence $\{P_k\}_k$ of path segments $P_k$, numbered k=1,2, . . . , K (K≧2), with path segment $P_{k'}$ (1≦k'<K) being intersected by path segment $P_{k'+1}$, in at least one point and with each path segment $P_k$ being surrounded by a corridor segment $C_k$ having a width approximately equal to $2d_k$, measured in a direction approximately perpendicular to a general direction of the segment $P_k$, where $d_k$ is a selected positive distance;

where the computer determines the perpendicular foot $\pi_k(L(t_s))$ of the location $L(t_s)$ on at least one of the path segments $P_k$, determines the distance $D_k(L(t_s))$ from the location $L(t_s)$ to the perpendicular foot $\pi_k(L(t_s))$, and determines whether the distance $D_k(L(t_s)) \leq d_k$ for at least one index value k;

where the computer determines that, when $D_k(L(t_s)) \leq d_k$ for at least one index value k, the vehicle is adhering to the selected route R; and where the computer determines, when $D_k(L(t_s)) > d_k$ for all index values k, that the vehicle is not adhering to the route R, and the computer then transmits at least one of (1) a signal indicating that the vehicle is not adhering to the route R and (2) the location coordinates of the vehicle for at least one selected time $t=t_{s'}$, for which $D_k(L(t_{s'})) > d_k$, to a selected vehicle monitoring station that is spaced apart from the vehicle.

2. The apparatus of claim 1, wherein, when said computer determines that said vehicle is not adhering to said route R, said computer transmits, to a selected vehicle monitoring station that is spaced apart from said vehicle, at least one of: (1) a signal indicating that said vehicle is not adhering to said route R and (2) the location coordinates of said vehicle for at least one of said selected times $t=t_{s'}$ for which $D_k(L(t_{s'})) > d_k$.

3. The apparatus of claim 1, further comprising display means, connected to said computer, for displaying said present location $L(t_s)$ of said vehicle and for displaying at least one of said path segments $P_k$ that provide an approximation to said selected route, wherein said computer includes a snap-to-route switch that, when activated, replaces said present location $L(t_s)$ of said vehicle by a perpendicular foot $\pi_{k,min}(L(t_s))$ of said present location on one of said path segments, $P_{k,min}$ where said distance $D_{k,min}(L(t_s)) = \min_k D_k(L(t_s))$, and displays the location of the perpendicular foot $\pi_{k,min}(L(t_s))$ on said path segment $P_{k,min}$.

4. The apparatus of claim 3, wherein, when said snap-to-route switch is activated:

said computer expresses any spatial location in terms of Cartesian coordinates (x,y,z), and said computer represents, and said display means displays, said present location $L(t_s)$ by a Cartesian coordinate triple $(x(L(t_s)), y(L(t_s)), z(L(t_s)))$; and said computer represents, and said display means displays, a line $L_k$ that passes through said present location $L(t_s)$ and passes perpendicularly through a plane containing said path segment $P_k$ by an equation $x(L(t_s)) \cos \theta_{x,k} + y(L)t_s)) \cos \theta_{y,k} + z(L(t_s)) \cos \theta_{z,k} [= K_k(L(t_s))] - p_k = -D_k(L(t_s)))$, where $\cos \theta_{x,k}$, $\cos \theta_{y,k}$ and $\cos \theta_{z,k}$ are the direction cosines of the normal to this plane containing said path segment $P_k$, where $P_k$ is the perpendicular distance from the origin to this plane containing said path segment $P_k$, and where $D_k(L(t_s))$ is the length of a segment of the line $L_k$ extending from said present location $L(t_s)$ to a point $\pi_k(L(t_s))$ on said path segment $P_k$.

5. The apparatus of claim 1, wherein said computer expresses any spatial location in terms of Cartesian coordinates (x,y,z);

said computer expresses the location of said vehicle at a first selected time $t=t_1$ in terms of the Cartesian coordinates $(x(t_1),y(t_1),z(t_1))$;

said computer determines average velocity components $(v_{x,avg}, v_{y,avg}, v_{z,avg})$ for said vehicle parallel to the Cartesian coordinate axes for a time interval $t_2 \leq t \leq t_1$, where $t_2$ is a second selected time that is less than $t_1$; and said computer estimates the coordinates of said present location L of said vehicle for a selected present time $t > t_1$ by the equations $$x(t)=x(t_1)+v_{x,avg}(t-t_1),$$

$$y(t)=y(t_1)+v_{y,avg}(t-t_1), \text{ and}$$

$$z(t)=z(t_1)+v_{z,avg}(t-t_1).$$

6. The apparatus of claim 1, wherein said computer expresses any spatial location in terms of Cartesian coordinates (x,y,z);

said computer expresses the location of said vehicle at a first selected time $t=t_1$ in terms of the Cartesian coordinates $(x(t_1),y(t_1),z(t_1))$;

said computer determines average velocity components $(v_{x,avg}, v_{y,avg}, v_{z,avg})$ for said vehicle parallel to the Cartesian coordinate axes for a time interval $t_2 \leq t \leq t_1$, where $t_2$ is a second selected time and is less than $t_1$;

said computer determines average acceleration components $(a_{x,avg}, a_{y,avg}, a_{z,avg})$ for said vehicle parallel to the Cartesian coordinate axes for a time interval $t_3 \leq t \leq t_1$, where $t_3$ is a third selected time and is less than $t_1$; and said computer estimates the coordinates of said present location L of said vehicle for a selected present time $t > t_1$ by the equations $$x(t)=x(t_1)+v_{x,avg}(t-t_1)+a_{x,avg}(t-t_1)^2/2,$$

$$y(t)=y(t_1)+v_{y,avg}(t-t_1)+a_{y,avg}(t-t_1)^2/2, \text{ and}$$

$$z(t)=z(t_1)+v_{z,avg}(t-t_1)+a_{z,avg}(t-t_1)^2/2.$$

7. The apparatus of claim 1, wherein said computer expresses any spatial location in terms of Cartesian coordinates (x,y,z);

said computer expresses the location of said vehicle at a first selected time $t=t_1$ in terms of the Cartesian coordinates $(x(t_1),y(t_1),z(t_1))$;

said computer determines average direction cosine components of the vehicle velocity $(\cos \theta_{vx,avg}, \cos \theta_{vy,avg}, \cos \theta_{vz,avg})$ parallel to the Cartesian coordinate axes or a time interval $t_2 \leq t \leq t_1$, where $t_2$ is a second selected time that is less than $t_1$;

said computer measures the cumulative distance $\delta(t)$ said vehicle has moved at the first selected time $t=t_1$ and at a selected present time $t > t_1$; and said computer estimates the coordinates of said present location L of said vehicle for the time t by the equations $$x(t)=x(t_1)+[\delta(t)-\delta(t_1)] \cos \theta_{vx,avg}(t-t_1),$$

$$y(t)=y(t_1)+[\delta(t)-\delta(t_1)] \cos \theta_{vy,avg}(t-t_1), \text{ and}$$

$$z(t)=z(t_1)+[\delta(t)-\delta(t_1)] \cos \theta_{vz,avg}(t-t_1).$$

8. The apparatus of claim 1, wherein said computer expresses any spatial location in terms of Cartesian coordinates (x,y,z);

said computer expresses the location of said vehicle at a first selected time $t=t_1$ in terms of the Cartesian coordinates $(x(t_1),y(t_1),z(t_1))$;

said computer determines average direction cosine components of the vehicle velocity $(\cos \theta_{vx,avg}, \cos \theta_{vy,avg}, \cos \theta_{vz,avg})$ parallel to the Cartesian coordinate axes for a time interval $t_2 \leq t \leq t_1$, where $t_2$ is a second selected time that is less than $t_1$;

said computer measures the velocity v(t) at which said vehicle is moving for a sequence of times between the first selected time $t=t_1$ and a selected present time $t > t_1$; and said computer estimates the coordinates of said present location L of said vehicle for the time t by the equations $$x(t) = x(t_1) + \int_{t_1}^{t} v(t')\cos\theta_{vx,avg}dt',$$

$$y(t) = y(t_1) + \int_{t_1}^{t} v(t')\cos\theta_{vy,avg}dt', \text{ and,}$$

$$z(t) = z(t_1) + \int_{t_1}^{t} v(t')\cos\theta_{vz,avg}dt',$$

9. The apparatus of claim 1, wherein said LD means is part of a location determination system that is drawn from the group of location determination systems consisting of Global Positioning System, Global Orbiting Navigational Satellite System, Loran, Omega, Decca, Tacan, JTIDS Relnav and Personal Location Reporting Service, where said LD means has an LD signal antenna to receive said LD signals from said LD signal source and has an LD signal receiver/processor to receive said LD signals from the LD signal antenna and to determine the present location of the LD signal antenna from said LD signals.

10. Apparatus for monitoring adherence of a vehicle to a selected time schedule along a selected vehicle route from a vehicle monitoring station, the apparatus comprising:

location determination (LD) means, carried on a selected vehicle, for receiving LD signals from an LD signal source spaced apart from the vehicle and for determining and recording the location coordinates corresponding to a location $L(t_s)$ of the vehicle at a selected time $t=t_s$;

a computer, carried on the vehicle and communicating with the LD means, having a selected time schedule for the vehicle stored therein, where the time schedule is represented by at least one ordered time schedule triple $(TI_n, L_n, d_n)$ in an ordered sequence $\{(TI_m, L_m, d_m)\}_m$ of one or more time schedule triples of values, where $TI_n = \{t | t_{n-\Delta tn} \leq t \leq t_n + \Delta t_n\}$ is a selected time interval, with $t_n$ and $\Delta t_n$ being selected times and with $\Delta t_n > 0$, $L_n$ is a selected location in a region through which the vehicle passes, and $d_n$ is a selected positive number;

where the LD means and computer are used to determine, for a sequence of one or more selected times $t=t'_{r,u}$ in an ordered sequence $\{t'_{r,v}\}_v$ of such times, lying in a chosen time schedule time interval $TI_r$ with associated selected location $L_r$, the location $L(t'_{r,u})$ of the vehicle at the time $t=t'_{r,u}$, to determine the distance between the location $L_r$ and the location $L(t'_{r,u})$, and to determine whether the distance between the location $L_r$ and the location $L(t'_{r,u})$ satisfies the relation distance $|L_r - L(t'_{r,u})| \leq d_r$ for at least one selected time $t'_{r,u}$ in the time interval $TI_r$;

where the computer determines that, when the relation distance relation $|L_r - L(t'_{r,u})| \leq d_r$ is satisfied for at least one selected time $t'_{r,u}$ in the time interval $TI_r$, the vehicle has adhered to the selected time schedule in the time interval $TI_r$; and where the computer determines that, when the relation distance relation $|L_r - L(t'_{r,u})| \leq d_r$ is not satisfied for any selected time $t'_{r,u}$ in the time interval $TI_r$, the vehicle has not adhered to the selected time schedule in the time interval $TI_r$.

11. The apparatus of claim 10, wherein, when said computer determines that said vehicle is not adhering to said selected time schedule in said time interval $TI_r$, said computer transmits, to a selected vehicle monitoring station that is spaced apart from said vehicle, at least one of: (1) a signal indicating that said vehicle has not adhered to said selected time schedule in said time interval $TI_r$, and (2) said time interval $TI_r$ and said associated location $L_r$ for which said vehicle has not adhered to the selected time schedule in said time interval $TI_r$.

12. The apparatus of claim 10, wherein said LD means is part of a location determination system that is drawn from the group of location determination systems consisting of Global Positioning System, Global Orbiting Navigational Satellite System, Loran, Omega, Decca, Tacan, JTIDS Relnav and Personal Location Reporting Service, where said LD means has an LD signal antenna to receive said LD signals form said LD signal source and has an LD signal receiver/processor to receive said LD signals from the LD signal antenna and to determine the present location of the LD signal antenna from said LD signals.

\* \* \* \* \*